United States Patent
Michimura et al.

(10) Patent No.: US 12,333,708 B2
(45) Date of Patent: Jun. 17, 2025

(54) METHOD, DEVICE, SYSTEM, AND COMPUTER PROGRAM FOR DETECTING WHEEL FASTENER LOOSENESS AND COMPUTER-READABLE MEDIUM STORING COMPUTER PROGRAM

(71) Applicant: VOLVO TRUCK CORPORATION, Gothenburg (SE)

(72) Inventors: Yousuke Michimura, Ageo (JP); Kan Iida, Ageo (JP); Noriaki Okimoto, Ageo (JP); Daisuke Ito, Ageo (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 168 days.

(21) Appl. No.: 17/756,839

(22) PCT Filed: Dec. 5, 2019

(86) PCT No.: PCT/JP2019/047664
§ 371 (c)(1),
(2) Date: Jun. 3, 2022

(87) PCT Pub. No.: WO2021/111599
PCT Pub. Date: Jun. 10, 2021

(65) Prior Publication Data
US 2023/0005118 A1    Jan. 5, 2023

(51) Int. Cl.
G06T 7/00      (2017.01)
F16B 31/02     (2006.01)
G01M 17/013    (2006.01)
G06T 5/80      (2024.01)
H04N 7/18      (2006.01)

(52) U.S. Cl.
CPC .............. *G06T 7/001* (2013.01); *F16B 31/02* (2013.01); *G01M 17/013* (2013.01); *G06T 5/80* (2024.01); *H04N 7/183* (2013.01)

(58) Field of Classification Search
None
See application file for complete search history.

(56) References Cited

U.S. PATENT DOCUMENTS 10,317,777 B2 *   6/2019   Qin .......................... G06T 7/13
11,247,317 B2 *   2/2022   Kobayashi .............. B25B 21/02
(Continued)

FOREIGN PATENT DOCUMENTS

CN   108956173 A  * 12/2018
JP   H08278116 A    10/1996
(Continued)

OTHER PUBLICATIONS

Hara, et al., Misalignment detectign device for spoked wheel (english text translation), (Year: 2017).*

(Continued)

*Primary Examiner* — Ricky Chin
(74) *Attorney, Agent, or Firm* — Venable LLP; Jeffri A. Kaminski

(57) ABSTRACT

An information device including a capturing function uses the capturing function to capture an image of a disc wheel to which a plurality of wheel fasteners are fastened. Then, the information device inspects whether any of the wheel fasteners appearing in the captured image is loose by comparing the captured image with a reference image in consideration of a reference point of the disc wheel appearing in the captured image.

13 Claims, 12 Drawing Sheets

(56) References Cited

U.S. PATENT DOCUMENTS

| | | | |
|---|---|---|---|
| 2016/0239957 A1* | 8/2016 | Akai | C12M 41/46 |
| 2018/0275521 A1* | 9/2018 | Wallow | G03F 7/7065 |
| 2018/0286029 A1* | 10/2018 | Mizobe | B08B 5/02 |
| 2018/0304675 A1* | 10/2018 | Mitsuyassu | B60B 3/04 |
| 2019/0087947 A1* | 3/2019 | Tripathi | G06T 7/62 |
| 2019/0217455 A1* | 7/2019 | Kobayashi | B25B 13/463 |
| 2019/0260972 A1* | 8/2019 | Behety | H04N 23/695 |
| 2019/0270338 A1* | 9/2019 | Wang | B60B 21/023 |
| 2019/0291507 A1* | 9/2019 | Li | G09F 21/045 |
| 2019/0366494 A1* | 12/2019 | Shimizu | B23P 19/06 |
| 2020/0074675 A1* | 3/2020 | Cejka | F16M 11/42 |
| 2020/0158656 A1* | 5/2020 | Chung | B61L 23/048 |
| 2021/0101263 A1* | 4/2021 | Hwang | B25B 21/002 |
| 2022/0041411 A1* | 2/2022 | Toida | B66C 23/42 |
| 2022/0185012 A1* | 6/2022 | Gartner | B60B 1/06 |
| 2022/0319184 A1* | 10/2022 | Hartmann | G06V 20/52 |
| 2022/0377256 A1* | 11/2022 | Sasaki | B25B 23/14 |
| 2023/0005118 A1* | 1/2023 | Michimura | G06T 5/80 |
| 2023/0254559 A1* | 8/2023 | Michiwaki | H04N 23/90 |
| | | | 348/374 |

FOREIGN PATENT DOCUMENTS

| | | | | |
|---|---|---|---|---|
| JP | 10317306 A | * | 12/1998 | |
| JP | 2004346591 A | | 12/2004 | |
| JP | 2009210276 A | | 9/2009 | |
| JP | 2016215787 A | | 12/2016 | |
| JP | 201747837 A | | 3/2017 | |
| JP | 2018009932 A | | 1/2018 | |
| JP | 2019126874 A | * | 8/2019 | |
| JP | 2021143892 A | * | 9/2021 | G06T 7/0002 |
| KR | 2017060711 A | * | 6/2017 | B63B 35/4413 |
| WO | 2005021983 A1 | | 3/2005 | |
| WO | 2017038803 A1 | | 3/2017 | |
| WO | WO-2017110125 A1 | * | 6/2017 | B60B 31/02 |
| WO | WO-2021182511 A1 | * | 9/2021 | G06T 7/0002 |

OTHER PUBLICATIONS

International Search Report and Written Opinion in corresponding International Application No. PCT/JP2019/047664 mailed Feb. 4, 2020 (6 pages).

Extended European Search Report dated Jul. 20, 2023 in corresponding European Patent Application No. 19955177.1, 8 pages.

* cited by examiner

[Fig. 1]
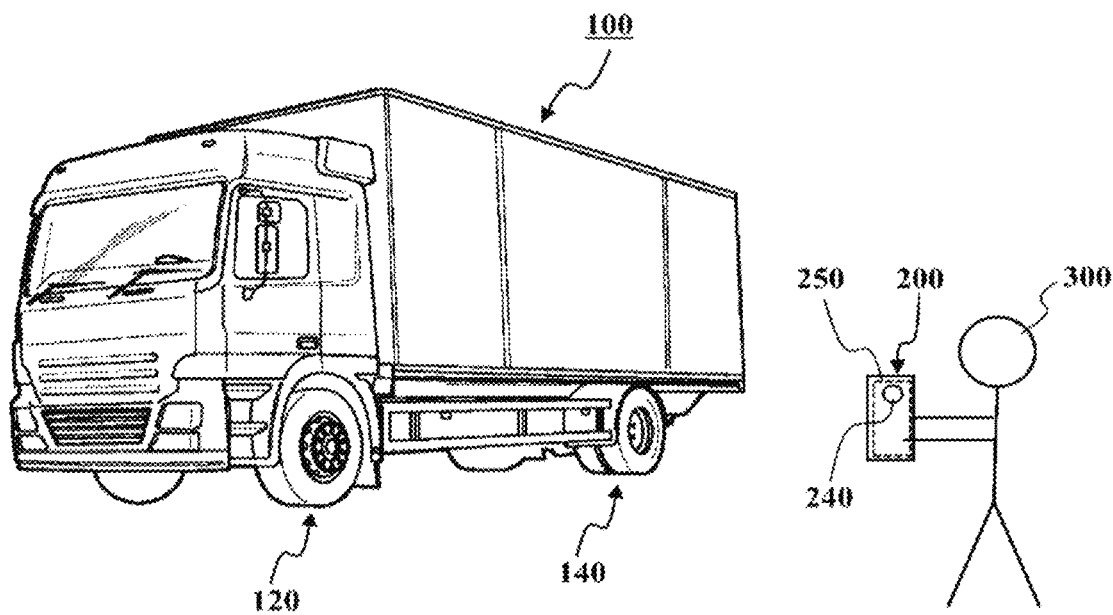
[Fig. 2]
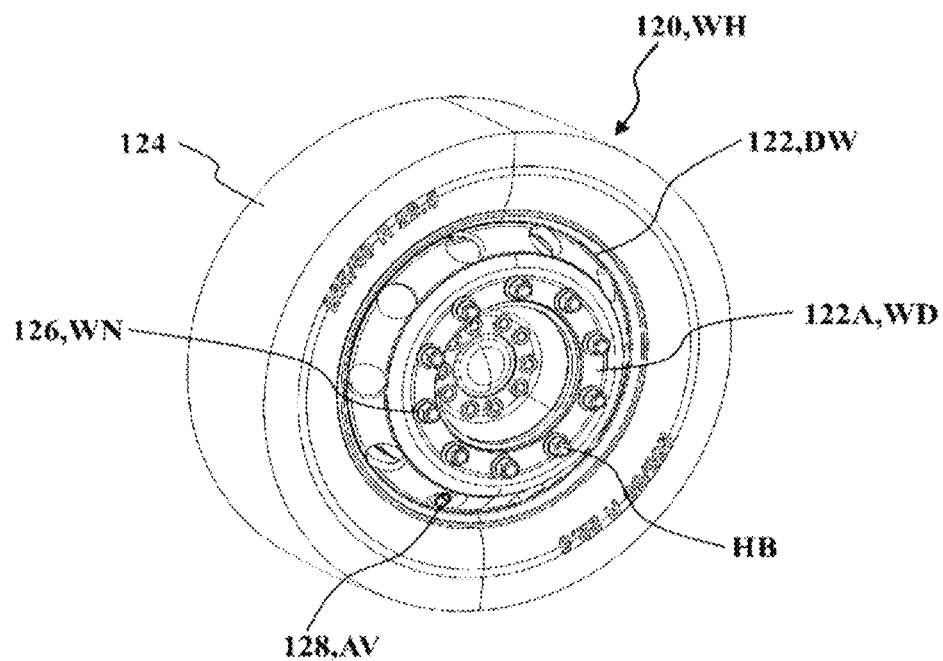

[Fig. 3]
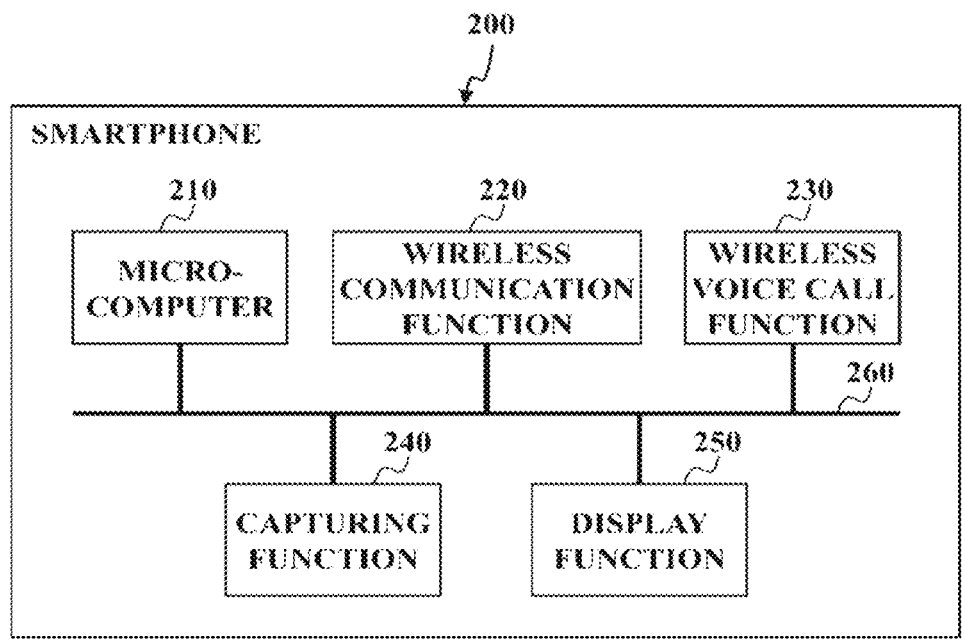

[Fig. 4]
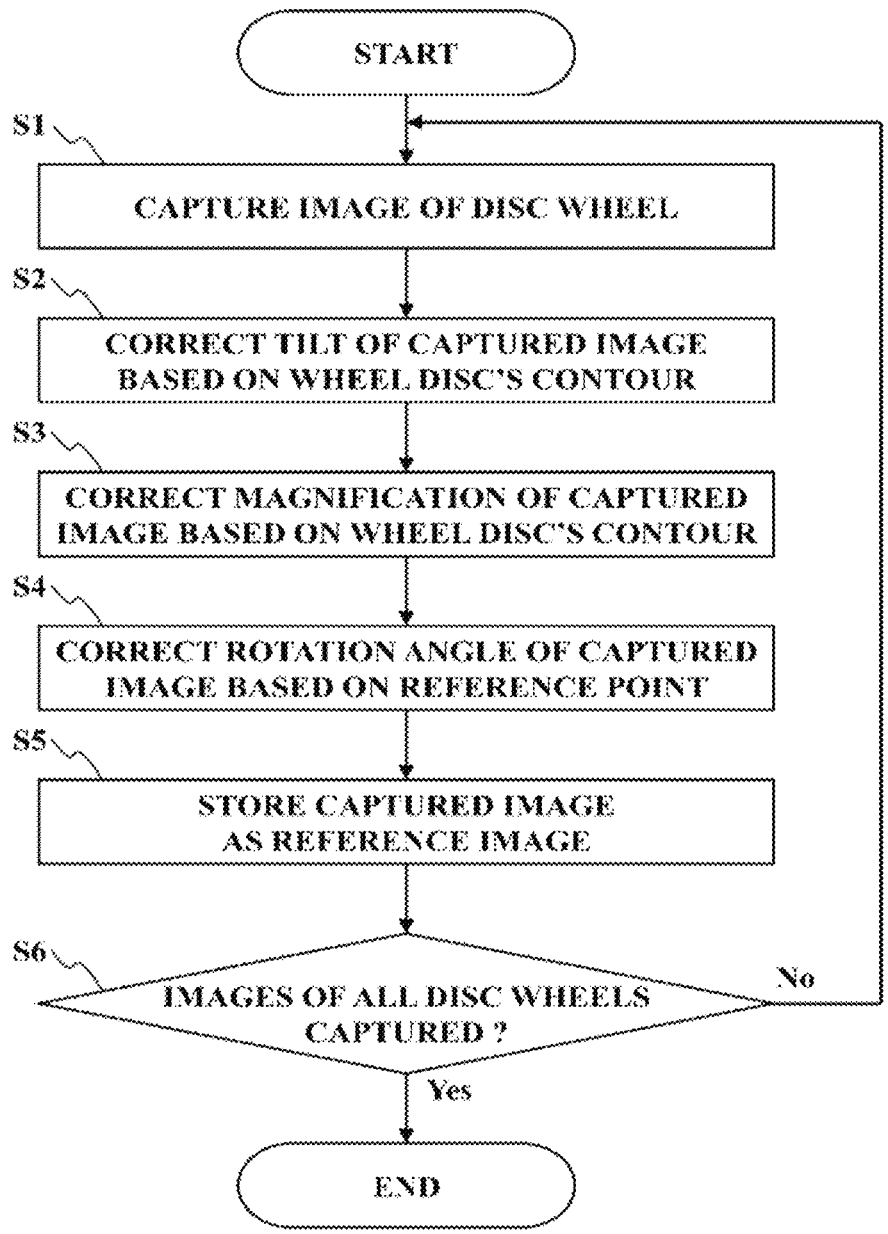

[Fig. 5]
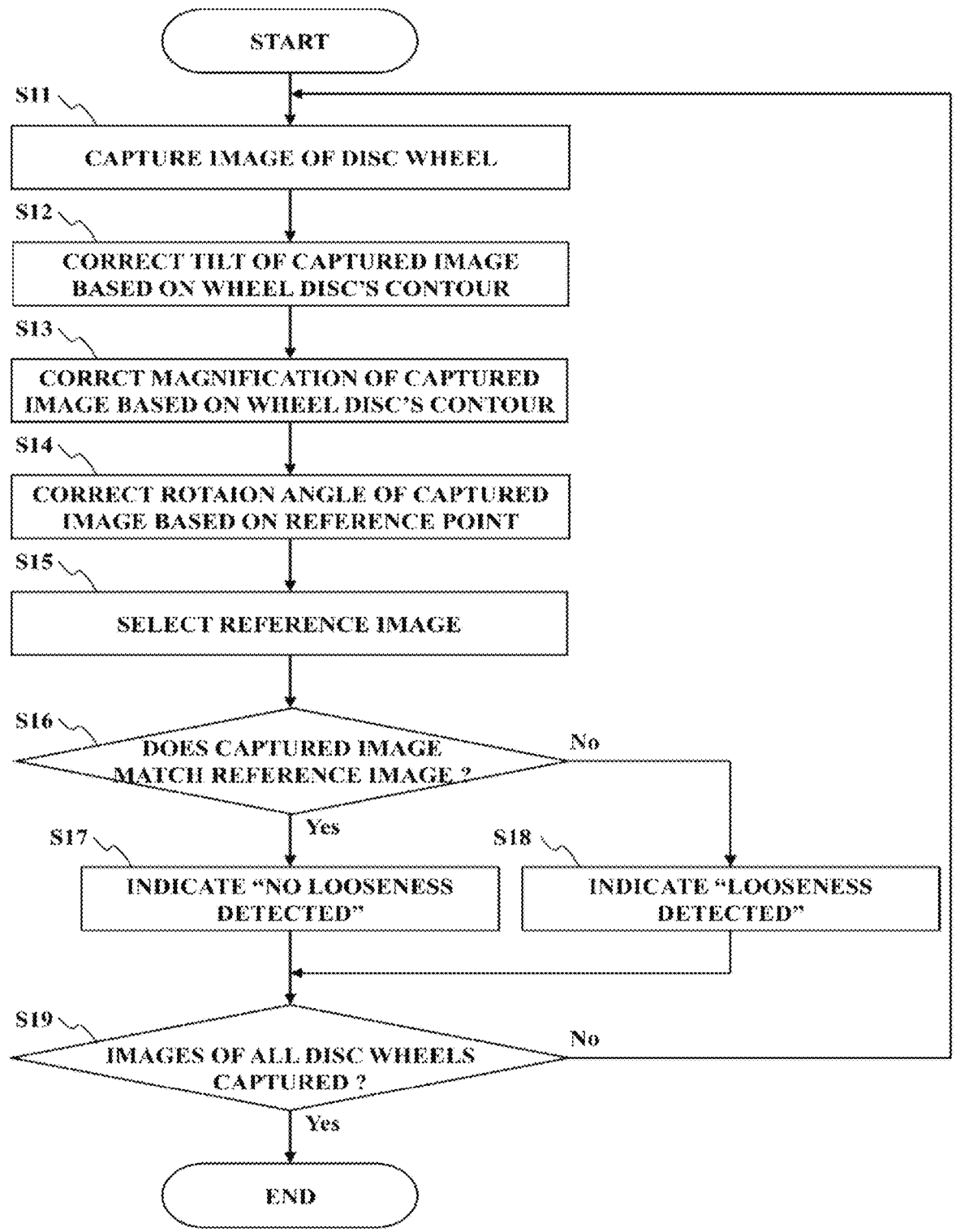

[Fig. 6]
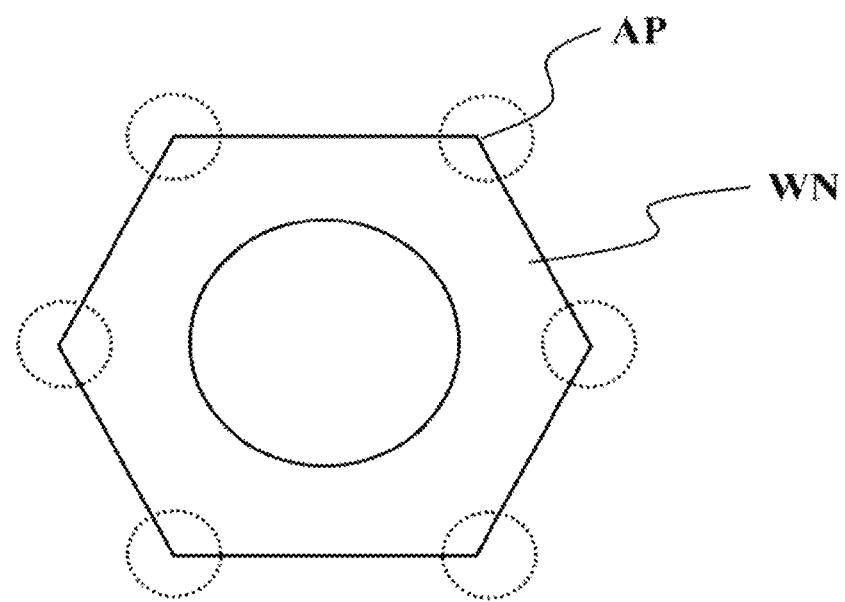

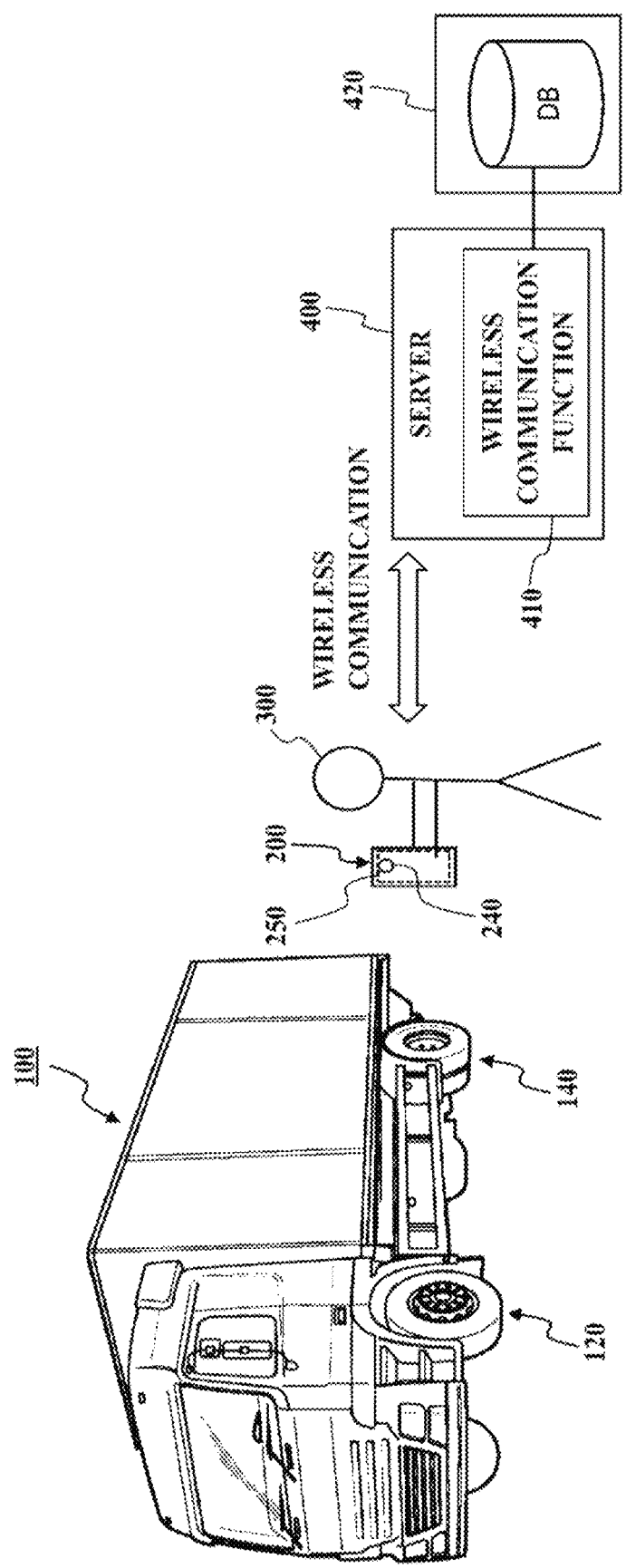
[Fig. 7]

[Fig. 8]
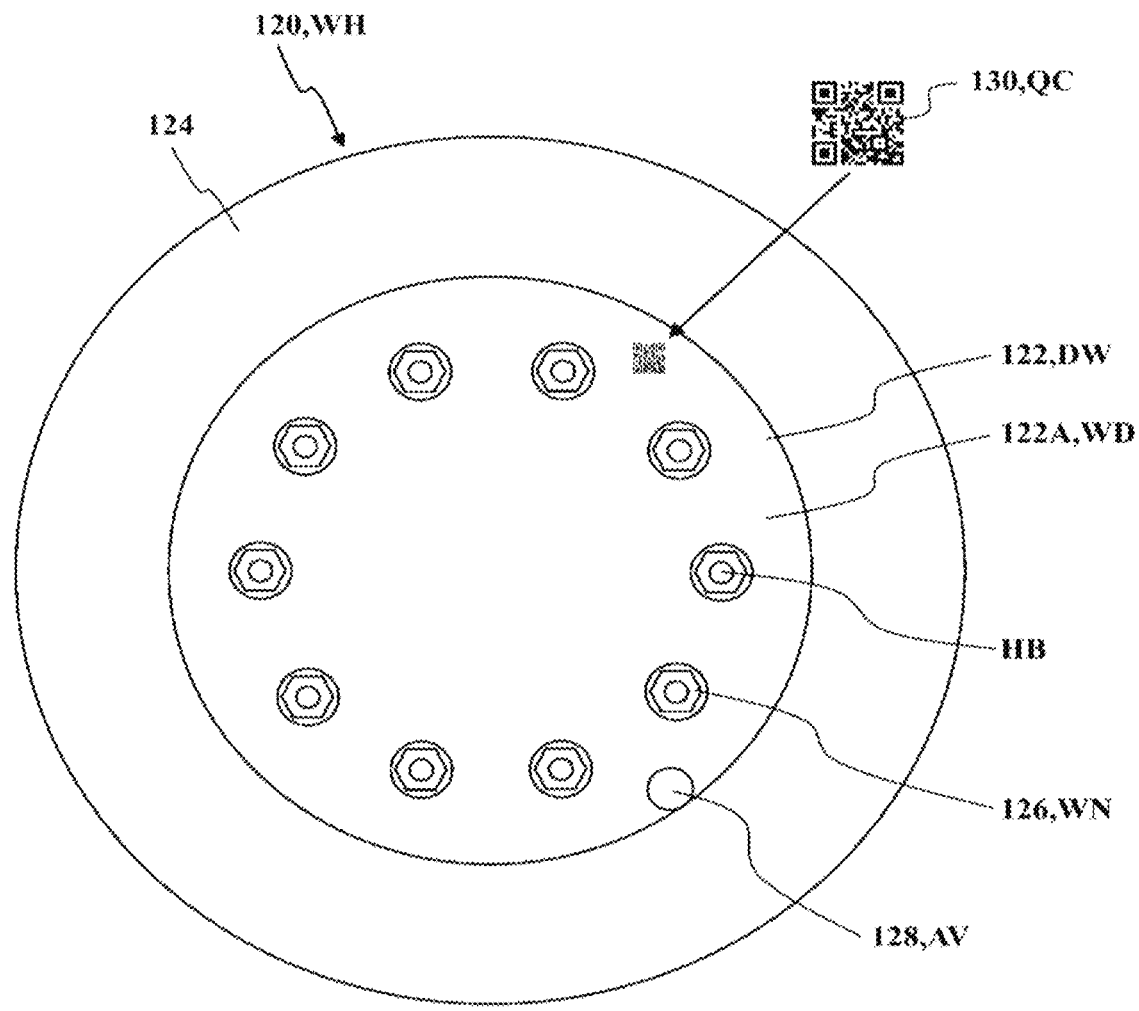

[Fig. 9]

| VEHICLE ID | WHEEL ID | NUT ID | INSPECTION RESULT (yyyymmdd) | | | | |
|---|---|---|---|---|---|---|---|
| | | | 20191101 | 20191102 | 20191103 | 20191104 | ... |
| 00000001 | 01 | 01 | OK | OK | OK | OK | ... |
| | | 02 | OK | OK | OK | OK | ... |
| | | ... | ... | ... | ... | ... | ... |
| | | 10 | OK | OK | OK | OK | ... |
| | 02 | 01 | OK | OK | OK | OK | ... |
| | | 02 | OK | OK | NG | OK | ... |
| | | ... | ... | ... | ... | ... | ... |
| | | 10 | OK | OK | OK | ... | ... |
| | ... | ... | ... | ... | ... | ... | ... |
| | 04 | 01 | OK | OK | OK | OK | ... |
| | | 02 | OK | OK | OK | OK | ... |
| | | ... | ... | ... | ... | ... | ... |
| | | 10 | OK | OK | OK | OK | ... |
| 00000002 | ... | ... | ... | ... | ... | ... | ... |

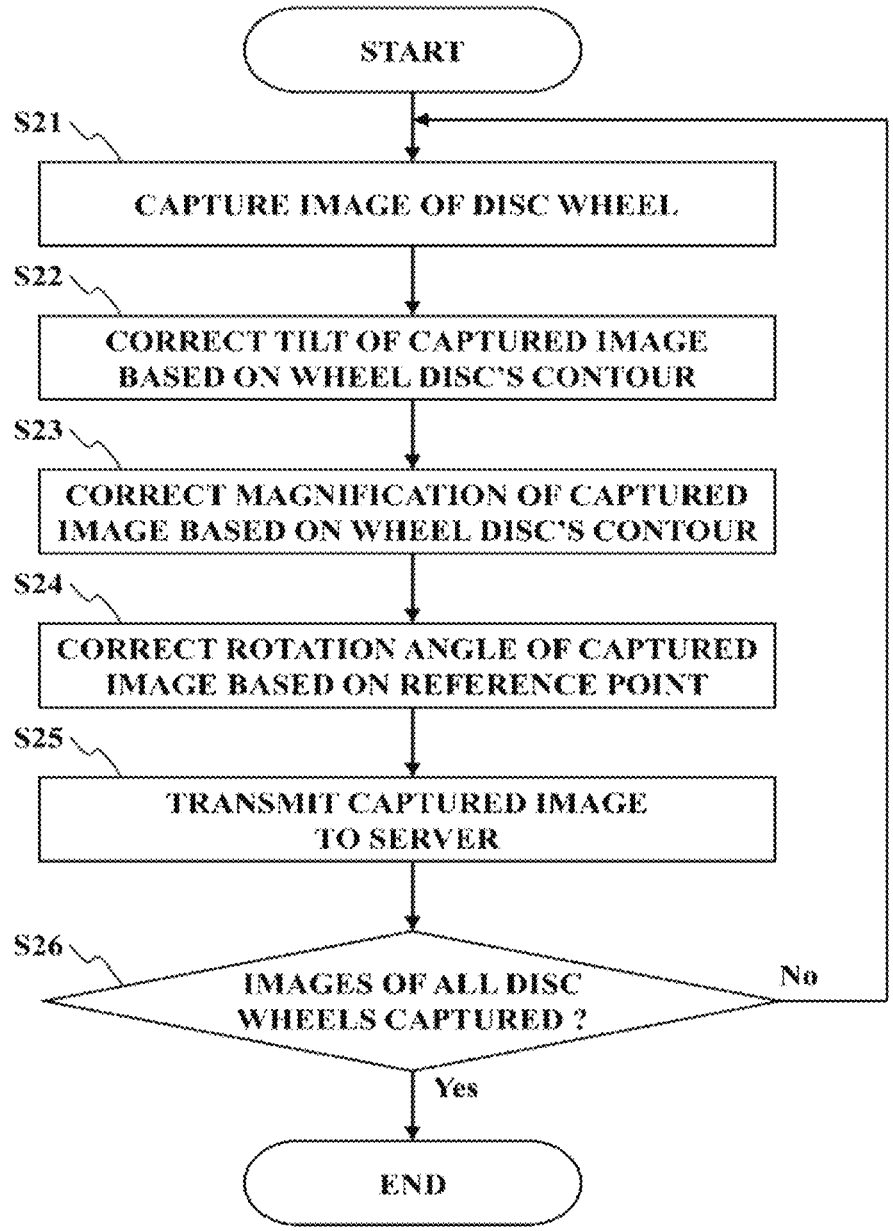
[Fig. 10]

[Fig. 11]
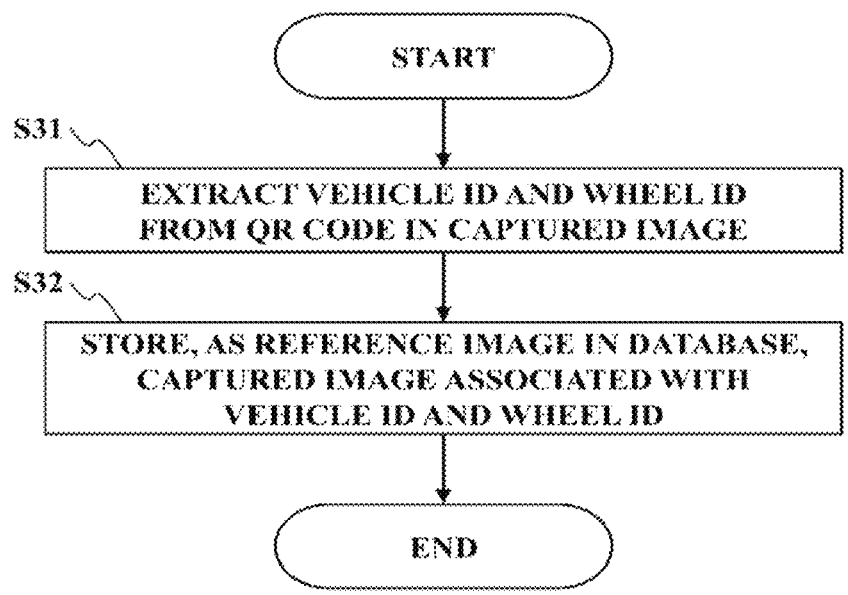

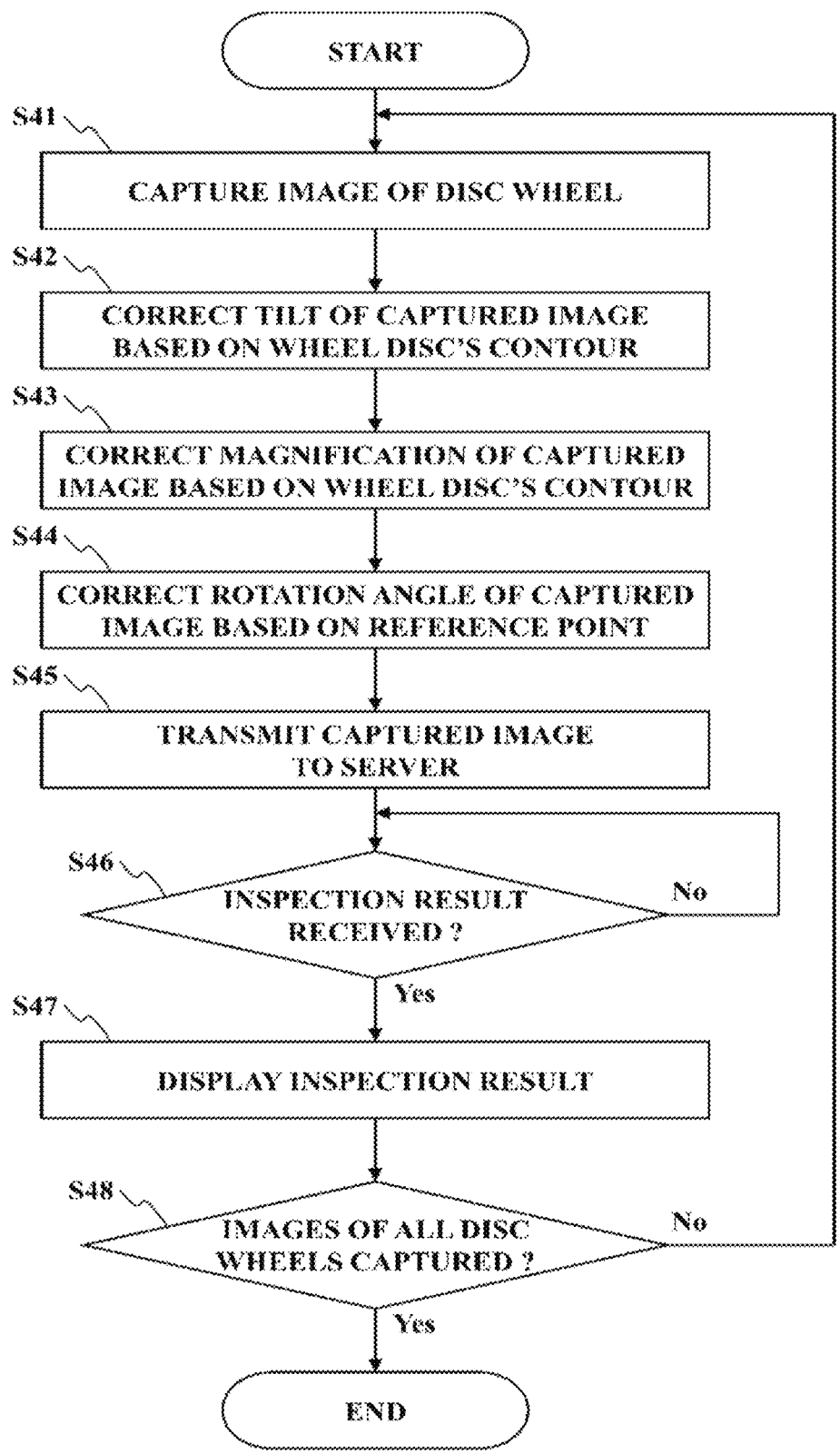
[Fig. 12]

[Fig. 13]
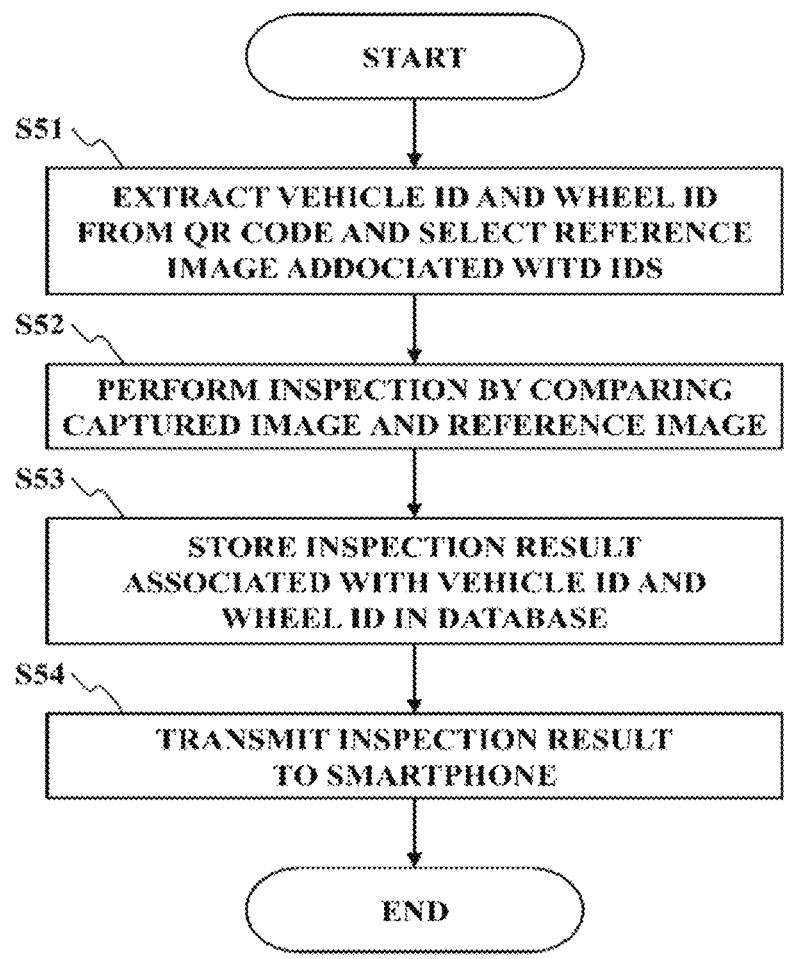

METHOD, DEVICE, SYSTEM, AND COMPUTER PROGRAM FOR DETECTING WHEEL FASTENER LOOSENESS AND COMPUTER-READABLE MEDIUM STORING COMPUTER PROGRAM

CROSS-REFERENCE TO RELATED APPLICATIONS

This application is a U.S. National Stage application of PCT/JP2019/047664, filed Dec. 5, 2019 and published on Jun. 10, 2021, as WO 2021/111599, all of which is hereby incorporated by reference in its entirety.

TECHNICAL FIELD

The present invention relates to a method, a device, a system, and a computer program for detecting looseness of wheel fasteners such as wheel nuts or wheel bolts, and also relates to a computer-readable medium storing the computer program.

BACKGROUND ART

Conventionally, techniques for detecting looseness of wheel fasteners such as wheel nuts or wheel bolts have been proposed, including the technique disclosed in JP 2009-210276 A (Patent Document 1). In the technique disclosed in Patent Document 1, an image of a wheel fastener with a mark is captured from a predetermined direction, and looseness of the wheel fastener is detected based on the mark appearing on the surface of the wheel fastener in the captured image.

CITATION LIST

Patent Literature

PTL 1: JP 2009-210276 A

SUMMARY OF INVENTION

Technical Problem

However, the technique disclosed in Patent Document 1 requires capturing images of the respective wheel fasteners from their individual predetermined directions. Thus, the technique requires much effort and time to perform inspection for detecting wheel fastener looseness, especially in inspection of a heavy-duty vehicle, such as a truck, which includes a large number of wheel fasteners.

Therefore, an object of the present invention is to provide a method, a device, a system, and a computer program for detecting wheel fastener looseness, and a computer-readable medium storing the computer program, which facilitate detecting wheel fastener looseness.

Solution to Problem

According to a first aspect of the present invention, an information device including a capturing function performs the steps of: using the capturing function to capture an image of a disc wheel to which a plurality of wheel fasteners are fastened; and inspecting whether any of the wheel fasteners appearing in the captured image is loose by comparing the captured image with a reference image in consideration of a reference point of the disc wheel appearing in the captured image.

According to a second aspect of the present invention, an information device including a capturing function, a wireless communication function, and a display function performs the steps of: using the capturing function to capture an image of a disc wheel to which a plurality of wheel fasteners are fastened; using the wireless communication function thereof to transmit the captured image to a server including a wireless communication function; using the wireless communication function thereof to receive an inspection result from the server; and using the display function to display the inspection result received from the server. The server performs the steps of: using the wireless communication function thereof to receive the captured image from the information device; inspecting whether any of the wheel fasteners appearing in the captured image is loose by comparing the captured image with a reference image in consideration of a reference point of the disc wheel appearing in the captured image; and using the wireless communication function thereof to transmit the inspection result to the information device.

Advantageous Effects of Invention

The present invention makes it possible to facilitate detecting wheel fastener looseness.

BRIEF DESCRIPTION OF DRAWINGS

FIG. 1 is a schematic diagram of a first embodiment of a device for detecting wheel fastener looseness.
FIG. 2 is a perspective view of an example of a front wheel of a truck.
FIG. 3 is a block diagram of an example of an internal structure of a smartphone.
FIG. 4 is a flowchart illustrating an example of reference image generation processing.
FIG. 5 is a flowchart illustrating an example of nut inspection processing.
FIG. 6 is an illustration of feature points of a wheel nut.
FIG. 7 is a schematic diagram for illustrating a second embodiment of the device for detecting wheel fastener looseness.
FIG. 8 is a plan view of an example of a front wheel of a truck.
FIG. 9 is an illustration of an example of a data structure of a database.
FIG. 10 is a flowchart illustrating an example of reference image generation processing performed by a smartphone.
FIG. 11 is a flowchart illustrating an example of reference image generation processing performed by a server.
FIG. 12 is a flowchart illustrating an example of nut inspection processing performed by a smartphone.
FIG. 13 is a flowchart illustrating an example of nut inspection processing performed by a server.

DESCRIPTION OF EMBODIMENTS

Hereinafter, embodiments for implementing the present invention will be described in detail with reference to the accompanying drawings.

FIG. 1 shows a first embodiment of a device for detecting wheel fastener looseness. Here, examples of wheel fasteners include wheel nuts and wheel bolts. However, the following embodiments will be described using an example in which the wheel fasteners are wheel nuts (the same applies hereinafter).

A truck 100, which is an example of a vehicle, is a 2-axle (4×2, 4×4) truck, for example. The truck 100 includes front wheels 120 detachably fastened to the left and right hubs of the front axle, and rear wheels 140 detachably fastened to the left and right hubs of the rear axle. Note that the truck 100 is not limited to a 2-axle truck and may be a different truck such as a 3-axle (6×2, 6×4, 6×6) truck or a 4-axle (8×4) truck. Furthermore, the vehicle is not limited to the truck 100 and may be a different vehicle such as a passenger car, a bus, or a construction machine.

As shown in FIG. 2, each of the front wheels 120 of the truck 100 is formed by assembling a tire 124 to a disc wheel 122. The disc wheel 122 has a cylindrical rim 120, R to which the inner peripheral edge of the tire 124 is assembled, and a disc-shaped wheel disc 122A joined to the inner peripheral surface of the rim. The plate surface of the wheel disc 122A has concentrically formed bolt holes (not shown). Hub bolts HB erected from the left or right hub of the front axle pass through these bolt holes. Wheel nuts 126 for detachably fastening the front wheel 120 to the corresponding hub are screwed, with a specified torque, onto the shanks of the hub bolts HB protruding from the bolt holes of the wheel disc 122A. In addition, an air valve 128 for filling the tire 124 with air and for adjusting the air pressure of the tire 124 is attached to a predetermined position of the disc wheel 122. In the illustrated example, each front wheel 120 is fastened to the corresponding hub with ten pairs of hub bolts HB and wheel nuts 126, but any number of hub bolts HB and wheel nuts 126 may be used.

The rear wheels 140 of the truck 100 have essentially the same structure as the front wheels 120 except that each rear wheel 140 has a so-called "double tire". Thus, the description therefor will be omitted. Note, however, that the number of hub bolts and wheel nuts for detachably fastening each rear wheel 140 to the corresponding hub may be different from that for the front wheel 120. In the following description, when there is no need to distinguish the front wheels 120 from the rear wheels 140, each of the front and rear wheels will be simply referred to as "wheel WH", and the terms "disc wheel DW", "wheel disc WD", "wheel nut WN", and "air valve AV" will be used to describe their constructions.

The device for detecting wheel fastener looseness is implemented in a smartphone 200, which is an example of an information device on which any application program (computer program) may be installed and executed. As shown in FIG. 3, the smartphone 200 includes a microcomputer 210, a wireless communication function 220, a wireless voice call function 230, a capturing function 240, a display function 250, and a bus 260. The microcomputer 210 includes a processor, a non-volatile memory, and a volatile memory. The wireless communication function 220 allows for wireless data transmission and receptions with external devices. The wireless voice call function 230 allows for wireless voice call with external devices. The capturing function 240 is implemented by a camera and/or the like. The display function 250 is implemented by a liquid crystal display and/or the like. The bus 260 electrically connects these functions together. The smartphone 200 is configured to implement various functions related to detection of wheel fastener looseness when a predetermined application program installed in non-volatile memory is executed on the smartphone 200. Note that the device for detecting wheel fastener looseness is not limited to being implemented in the smartphone 200, and may also be implemented in any other well-known information device that has a capturing function and on which any application program may be installed and executed.

The smartphone 200 performs the steps of: using the capturing function 240 to capture an image of one of the disc wheels DW to which the wheel nuts WN are fastened; and inspecting whether any of the wheel nuts WN appearing in the captured image is loose by comparing the captured image with the reference image of the disc wheel DW in consideration of the reference point of the disc wheel DW appearing in the captured image. For example, the smartphone 200 performs these steps when operated by an operator 300 such as a driver of the truck 100 or an inspector in, for example, a start-up inspection.

FIG. 4 shows an example of reference image generation processing performed by the smartphone 200, which is triggered when the operator 300 selects "Reference Image Generation" from a menu of operations. Here, when the application program is executed, the smartphone 200 uses the display function 250 to display an initial screen that includes the menu of operations such as "Reference Image Generation" and "Nut Inspection", and waits for instructions from the operator 300 (the same applies hereinafter).

In step 1 (abbreviated as "S1" in FIG. 4; the same applies to the other steps in the drawings below), the smartphone 200 uses the capturing function 240 to capture an image of one of the disc wheels DW of the wheels WH in the truck 100. In this event, which disc wheel DW is to be currently captured may be determined, for example, based on the shooting order previously specified by the operator 300, and the smartphone 200 may instruct which image to capture from among the disc wheels DW one by one in this specified order (the same applies hereinafter).

In step 2, the smartphone 200 corrects the tilt of the captured image based on the contour of the wheel disc WD of the disc wheel DW appearing in the captured image. Ideally, the disc wheel DW should be captured from a position facing the disc wheel DW to ensure that the disc wheel DW does not appear tilted in the resultant reference image. However, the operator 300 who uses the smartphone 200 to capture disc wheels DW may capture each disc wheel DW from a direction not parallel but inclined to the rotation axis of the disc wheel DW. Thus, by leveraging the fact that when an image of the disc wheel DW is captured from a position inclined with respect to the rotation axis of the disc wheel DW, the contour of the wheel disc WD in the captured image is distorted in one direction so as to appear elliptical, the tilt of the captured image is corrected so that the contour of the wheel disc WD becomes closer to a perfect circle. This approach allows obtaining a desired image capturing the disc wheel DW without requiring the disc wheel DW to be captured from a strictly controlled direction.

In step 3, the smartphone 200 corrects the magnification of the captured image based on the contour of the wheel disc WD of the disc wheel DW appearing in the captured image. Ideally, the disc wheels DW should be captured from positions away from the disc wheel DW by a predetermined distance to ensure that the disc wheels DW appear the same size in the resultant reference images. However, the operator 300 who uses the smartphone 200 to capture disc wheels DW may capture images of the disc wheels DW at various capturing distances rather than at a constant capturing distance. Thus, by leveraging the fact that the contour size of the wheel disc WD in a captured image changes as the capturing distance from the disc wheel DW changes, the magnification of the captured image is corrected so that the contour of the wheel disc WD becomes closer to a circle with a predetermined diameter. This approach allows obtaining a desired image capturing the disc wheel DW without requiring the disc wheel DW to be captured at a strictly controlled capturing distance.

In step 4, the smartphone 200 corrects the rotation angle of the captured image based on the reference point of the disc wheel DW appearing in the captured image. Ideally, the wheel nuts WN should constantly appear in their predetermined positions (predetermined angular positions) in the reference images. However, the wheels WH rotate while the truck 100 is travelling, so that each wheel nut WN is not always in the same position. Thus, the captured image cannot be used as a reference image without rotation angle correction. Thus, the rotation angle of the captured image is corrected based on the reference point of the disc wheel DW so that, for example, the reference point appears at a highest position in the captured image. For example, the position at which the air valve AV is attached in the disc wheel DW may be used as the reference point. This allows obtaining an image in which the wheel nuts WN appear at their predetermined positions, and which is thus qualified as a reference image.

In step 5, the smartphone 200 writes and stores the captured image after the above corrections as a reference image in the nonvolatile memory. In this event, it is preferable to store each reference image so that it can be identified which wheel WH is associated with the reference image.

In step 6, the smartphone 200 determines whether it has captured images of all the disc wheels DW by determining whether it has captured an image of the disc wheel DW of the last wheel WH in the order specified by the operator 300. When the smartphone 200 determines that it has captured images of all the disc wheels DW (Yes), the reference image generation processing ends. On the other hand, when the smartphone 200 determines that it has not yet captured images of all the disc wheels DW (No), the operation returns to step 1.

In the reference image generation processing, when the operator 300 operates the smartphone 200 to capture an image of a disc wheel DW, the tilt and magnification of the captured image are corrected based on the contour of the wheel disc WD appearing in the captured image. Furthermore, the rotation angle of the captured image is also corrected by using, as a reference point, the position at which the air valve AV is attached in the disc wheel DW. Then, the captured image after the above corrections is stored as a reference image in the nonvolatile memory. As such, the reference image is an easy-to-compare image having the corrected tilt, magnification, and rotation angle.

FIG. 5 shows an example of nut inspection processing performed by the smartphone 200, which is triggered when the operator 300 selects "Nut Inspection" from the menu of operations. Note that the same steps as in the reference image generation processing will be briefly described to avoid redundant description. Please also refer to the above description, if necessary (the same applies hereinafter).

In step 11, the smartphone 200 uses the capturing function 240 to capture an image of one of the disc wheels DW of the wheels WH in the truck 100.

In step 12, the smartphone 200 corrects the tilt of the captured image based on the contour of the wheel disc WD of the disc wheel DW appearing in the captured image.

In step 13, the smartphone 200 corrects the magnification of the captured image based on the contour of the wheel disc WD of the disc wheel DW appearing in the captured image.

In step 14, the smartphone 200 corrects the rotation angle of the captured image based on the reference point of the disc wheel DW appearing in the captured image.

In step 15, from among multiple reference images stored in the nonvolatile memory, the smartphone 200 selects a reference image associated with the currently captured disc wheel DW.

In step 16, the smartphone 200 compares the captured image with the reference image and determines whether they match. Specifically, the smartphone 200 performs, for example, an exclusive OR (XOR) operation on each pixel of the captured image and the corresponding pixel of the reference image in a region including the wheel nuts WN, and determines that the captured image matches the reference image when the number of the operations returning "FALSE" is less than a predetermined value. Here, the predetermined value can be an appropriate value set in consideration of, for example, the accuracy in detecting looseness of the wheel nuts WN, the pixel resolution of the capturing function 240, the correction accuracies, and the like. When the smartphone 200 determines that the captured image matches the reference image (Yes), the operation proceeds to step 17. When the smartphone 200 determines that the captured image does not match the reference image (No), the operation proceeds to step 18.

Alternatively, the captured image and the reference image may be compared using a known image recognition function by extracting feature points of the wheel nuts WN appearing in the captured image and the reference image. Here, each wheel nut WN has a regular hexagonal shape with the apexes AP in plan view. Thus, in this case, these apexes AP may be focused on, as indicated by dashed-line circles in FIG. 6, and the relative coordinates of the apexes AP with respect to the reference point may be compared between the captured image and the reference image.

In step 17, based on the determination that the captured image matches the reference image, the smartphone 200 uses the display function 250 to display an indication that no nut looseness has been detected, thereby reporting to the operator 300 that all the wheel nuts WN appearing in the captured image are not loose. Then, the operation proceeds to step 19.

In step 18, based on the determination that the captured image does not match the reference image, the smartphone 200 uses the display function 250 to display an indication that nut looseness has been detected, thereby reporting to the operator 300 that at least one of the wheel nuts WN appearing in the captured image is loose. At that time, the smartphone 200 may additionally display information that allows for identifying which wheel nut WN is loose, in accordance with the comparison result between the captured image and the reference image. Then, the operation proceeds to step 19.

In step 19, the smartphone 200 determines whether it has captured images of all the disc wheels DW. When the smartphone 200 determines that it has captured images of all the disc wheels DW (Yes), the nut inspection processing ends. On the other hand, when the smartphone 200 determines that it has not yet captured images of all the disc wheels DW (No), the operation returns to step 11.

In the nut inspection processing, when the operator 300 operates the smartphone 200 to capture an image of a disc wheel DW, the tilt and magnification of the captured image are corrected based on the contour of the wheel disc WD appearing in the captured image. Furthermore, the rotation angle of the captured image is also corrected by using, as a reference point, the position at which the air valve AV is attached in the disc wheel DW. Then, a reference image associated with the captured image is selected from among multiple reference images stored in the nonvolatile memory of the smartphone 200. The pixels or the positions of extracted feature points are compared between the captured image and the selected reference image, and based on this comparison, it is determined whether the captured image matches the reference image, i.e., whether at least one of the wheel nuts WN appearing in the captured image is loose. This determination result is displayed using the display function 250 of the smartphone 200, thereby being reported to the operator 300 who is inspecting for looseness of the wheel nuts WN.

Thus, with the nut inspection processing, when the operator 300 uses the capturing function 240 of the smartphone 200 to capture an image of the disc wheel DW of each wheel WH of the truck 100, all the wheel nuts WN appearing in the captured image are inspected for looseness in consideration of the reference point of the disc wheel DW. Therefore, unlike the aforementioned conventional technique which requires capturing images of the respective wheel nuts WN from their individual predetermined directions, the nut inspection processing according to the first embodiment allows for collectively inspecting all the wheel nuts WN that fasten a disc wheel DW to the corresponding hub, and facilitates detecting looseness of the wheel nuts WN.

FIG. 7 shows a second embodiment of the device for detecting wheel fastener looseness.

In the second embodiment, the device for detecting wheel fastener looseness is implemented in a form of a system for detecting wheel fastener looseness including the smartphone 200 of the first embodiment shown in FIG. 1 and a server 400 of a service provider. Note that the smartphone 200 is as described in the first embodiment and the description therefor will be omitted to avoid redundant description. Please also refer to the above description, if necessary.

Each front wheel 120 of the truck 100 is substantially the same as that of the first embodiment, expect for having a QR code (TM) 130, as shown in FIG. 8. The QR code 130 is attached at a predetermined position on the plate surface of the wheel disc 122A of the disc wheel 122, and functions as an identifier of the vehicle (vehicle ID) and an identifier of the disc wheel 122 (wheel ID). In the following description, as in the first embodiment, when there is no need to distinguish the front wheels 120 from the rear wheels 140, each of the front and rear wheels will be simply referred to as "wheel WH", and the terms "disc wheel DW", "wheel disc WD", "wheel nut WN", "air valve AV", and "QR code QC" will be used to describe their constructions.

The server 400 is formed using a general-purpose computer having a wireless communication function 410, for example. The server 400 includes an auxiliary storage 420 such as a magnetic disc device. In the auxiliary storage 420, a database DB having the data structure shown in FIG. 9 is built. The database DB contains records in each of which a vehicle ID is associated with wheel IDs and nut IDs. The vehicle IDs identify individual vehicles. The wheel IDs identify the individual disc wheels DW of the wheels WH. The nut IDs identify the individual wheel nuts WN of each disc wheel DW. In the database DB, nut inspection results (OK or NG) are time-serially stored with inspection dates for each wheel nut WN. Note that the database DB is not limited to being built in the auxiliary storage 420 and may be built in a cloud storage.

The vehicle IDs, wheel IDs, and nut IDs in the database DB may be previously defined by a manager of a company that operates multiple trucks 100, such as a trucking company, by using a personal computer (not shown) connected to the server 400 via the Internet, for example. As such, the server 400 preferably provides an application program for building the database DB to a service user such as a trucking company.

The smartphone 200 performs the steps of: using the capturing function 240 to capture an image of one of the disc wheels DW to which the wheel nuts WN are fastened; using the wireless communication function 220 to transmit the captured image to the server 400; using the wireless communication function 220 to receive an inspection result from the server 400; and using the display function 250 to display the inspection result received from the server 400. On the other hand, the server 400 performs the steps of: using the wireless communication function 410 to receive the captured image from the smartphone 200; inspecting whether any of the wheel fasteners appearing in the captured image is loose by comparing the captured image with the reference image of the disc wheel DW in consideration of the reference point of the disc wheel DW appearing in the captured image; and using the wireless communication function 410 to transmit the inspection result to the smartphone 200. For example, the smartphone 200 performs these steps when operated by the operator 300 such as a driver of the truck 100 or an inspector in, for example, a start-up inspection.

FIG. 10 shows an example of the reference image generation processing performed by the smartphone 200, which is triggered when the operator 300 selects "Reference Image Generation" from the menu of operations.

In step 21, the smartphone 200 uses the capturing function 240 to capture an image of one of the disc wheels DW of the wheels WH in the truck 100. Unlike in the first embodiment, the currently captured disc wheel DW can be identified based on the QR code QC attached to the wheel disc WD. Thus, the operator 300 may capture images of the disc wheels DW in any order.

In step 22, the smartphone 200 corrects the tilt of the captured image based on the contour of the wheel disc WD of the disc wheel DW appearing in the captured image.

In step 23, the smartphone 200 corrects the magnification of the captured image based on the contour of the wheel disc WD of the disc wheel DW appearing in the captured image.

In step 24, the smartphone 200 corrects the rotation angle of the captured image based on the reference point of the disc wheel DW appearing in the captured image.

In step 25, the smartphone 200 uses the wireless communication function 220 to transmit, to the server 400, the captured image after the above corrections.

In step 26, the smartphone 200 determines whether it has captured images of all the disc wheels DW by, for example, counting the captured images of disc wheels DW and determining whether the count has reached a preset value. When the smartphone 200 determines that it has captured images of all the disc wheels DW (Yes), the reference image generation processing ends. On the other hand, when the smartphone 200 determines that it has not yet captured images of all the disc wheels DW (No), the operation returns to step 21. Note that the preset value may be associated with a wheel ID, for example.

In the reference image generation processing, when the operator 300 operates the smartphone 200 to capture an image of a disc wheel DW, the tilt and magnification of the captured image are corrected based on the contour of the wheel disc WD appearing in the captured image. Furthermore, the rotation angle of the captured image is also corrected by using, as a reference point, the position at which the air valve AV is attached in the disc wheel DW.

Then, the captured image after the above corrections is transmitted to the server 400. Here, the effects of the captured image corrections are as described in the first embodiment. Accordingly, for details of the correction effects, please refer to the above description.

FIG. 11 shows an example of the reference image generation processing performed by the server 400, which is triggered when the server 400 receives a captured image from the smartphone 200.

In step 31, the server 400 analyzes the QR code QC appearing in the captured image, and extracts the vehicle ID and the wheel ID therefrom.

In step 32, the server 400 stores, in the database DB, the captured image associated with the vehicle ID and the wheel ID as a reference image.

In this reference image generation processing, the QR code QC appearing in the captured image is analyzed and the vehicle ID and the wheel ID are extracted therefrom. Then, the captured image associated with the vehicle ID and the wheel ID is stored as the reference image in the database DB that is accessible by the server 400. Thus, simply specifying the vehicle ID and the wheel ID will uniquely determine the reference image associated with them.

FIG. 12 shows an example of nut inspection processing performed by the smartphone 200, which is triggered when the operator 300 selects "Nut Inspection" from the menu of operations.

In step 41, the smartphone 200 uses the capturing function 240 to capture an image of one of the disc wheels DW of the wheels WH in the truck 100. As described above, in the second embodiment, the vehicle ID and the wheel ID of the currently captured disc wheel DW can be identified by analyzing the QR code QC attached to the wheel disc WD of the disc wheel DW. Thus, the operator 300 may capture images of the disc wheels DW in any order.

In step 42, the smartphone 200 corrects the tilt of the captured image based on the contour of the wheel disc WD of the disc wheel DW appearing in the captured image.

In step 43, the smartphone 200 corrects the magnification of the captured image based on the contour of the wheel disc WD of the disc wheel DW appearing in the captured image.

In step 44, the smartphone 200 corrects the rotation angle of the captured image based on the reference point of the disc wheel DW appearing in the captured image. In the second embodiment, either the position at which the air valve AV is attached or the position at which the QR code QC is attached in the wheel disc WD may be used as the reference point.

In step 45, the smartphone 200 uses the wireless communication function 220 to transmit, to the server 400, the captured image after the above corrections.

In step 46, the smartphone 200 determines whether it has received an inspection result from the server 400 by using the wireless communication function 220. When the smartphone 200 determines that it has received an inspection result (Yes), the operation proceeds to step 47. On the other hand, when the smartphone 200 determines that it has not yet received an inspection result (No), the smartphone 200 waits until it receives the inspection result.

In step 47, the smartphone 200 uses the display function 250 to display the inspection result received from the server 400. Specifically, when the inspection result indicates that at least one of the wheel nuts WN of the disc wheel DW is loose, the smartphone 200 reports this to the operator 300. When the inspection result indicates that none of the wheel nuts WN is loose, the smartphone 200 reports this to the operator 300.

In step 48, the smartphone 200 determines whether it has captured images of all the disc wheels DW. When the smartphone 200 determines that it has captured images of all the disc wheels DW (Yes), the nut inspection processing ends. On the other hand, when the smartphone 200 determines that it has not yet captured images of all the disc wheels DW (No), the operation returns to step 41.

FIG. 13 shows an example of the nut inspection processing performed by the server 400, which is triggered when the server 400 receives a captured image from the smartphone 200 using the wireless communication function 410.

In step 51, the server 400 analyzes the QR code QC appearing in the received captured image and extracts the vehicle ID and the wheel ID therefrom, and selects a reference image associated with the vehicle ID and the wheel ID from among the reference images stored in the database DB.

In step 52, the server 400 compares the captured image with the reference image and inspects whether the captured image matches the reference image, i.e., whether at least one of the wheel nuts WN of the disc wheel DW appearing in the captured image is loose. Here, the server 400 may return a nut inspection result for each of the wheel nuts WN, such as returning "OK" when the wheel nut WN is not loose and returning "NG" when the wheel nut WN is loose.

In step 53, the server 400 time-serially stores, in the database DB, the inspection result and date associated with the vehicle ID and the wheel ID.

In step 54, the server 400 uses wireless communication function 410 to transmit the inspection result to the smartphone 200. Then, the nut inspection processing of the server 400 ends.

In the nut inspection processing, when the operator 300 operates the smartphone 200 to capture an image of a disc wheel DW, the tilt and magnification of the captured image are corrected based on the contour of the wheel disc WD appearing in the captured image. Furthermore, the rotation angle of the captured image is also corrected by using, as a reference point, either the position at which the air valve AV is attached or the position at which the QR code QC is attached in the disc wheel DW. Then, the captured image after the above corrections is transmitted to the server 400.

Upon receiving the captured image, the server 400 extracts the vehicle ID and the wheel ID from the QR code QC appearing in the captured image. Then, the server 400 selects a reference image associated with the vehicle ID and the wheel ID from among the multiple reference images stored in the database DB. The server 400 compares the captured image with the reference image and inspects whether any of the wheel nuts WN of the disc wheel DW is loose. Then, the server 400 time-serially stores the inspection result in the database DB and transmits the inspection result to the smartphone 200.

Upon receiving the inspection result, the smartphone 200 reports the inspection result of the wheel nuts WN to the operator 300. If the inspection result indicates any of the wheel nuts WN is loose, the operator 300 can tighten the loose wheel nut WN with a specified torque to ensure that the wheel WH is reliably fastened to the corresponding hub.

Accordingly, in the second embodiment, the smartphone 200 and the server 400 cooperate with each other to provide the same operational advantages and effects as in the first embodiment. Thus, unlike the aforementioned conventional technique which requires capturing images of the respective wheel nuts WN from their individual predetermined directions, the nut inspection processing according to the second embodiment allows for collectively inspecting all the wheel nuts WN that fasten a disc wheel DW to the corresponding hub, and facilitates detecting looseness of the wheel nuts WN.

Furthermore, with the system according to the second embodiment, a manager of a company that operates multiple trucks 100, such as a trucking company, can use a personal computer connected to the server 400 via the Internet to check the time-series inspection results stored in the database DB. Since this system allows the manager to identify which disc wheel DW is fastened to which hub, the manager can determine when to perform replacement or rotation of the tires 124 in consideration of the travel distance after wheel fastening, for example.

The application program for performing any of the above methods may be stored in a computer-readable medium such as an SD card or a USB memory and distributed on the market. As an alternative, the application program may be stored in a storage in a node connected to the Internet or the like and distributed from this node. In this case, the storage in the node is understood as an example of the computer-readable medium.

It should be noted that one skilled in the art could have easily understood that some of the technical features in each of the above embodiments may be omitted, combined with any one or more technical features in another embodiment, and/or replaced with one or more well-known technical features to provide various alternative embodiments.

For example, in the second embodiment, a one-dimensional barcode may be used in place of the QR code QC so as to function as a vehicle ID and a wheel ID. In the first and second embodiments, captured images varying in brightness may be corrected to have a predetermined color temperature. Also, images captured in full color may be converted into grayscale images, immediately after being captured, and thereafter subjected to processing in order to reduce their transmission time and processing time.

REFERENCE SIGNS LIST

100 truck
120 front wheel
122, DW disc wheel
122A, WD wheel disc
126, WN wheel nut
128, AV air valve
130, QC QR code
140 rear wheel
200 smartphone (information device)
220 wireless communication function
240 capturing function
250 display function
400 server
410 wireless communication function
WH wheel

The invention claimed is:

1. A method for detecting wheel fastener looseness, the method comprising the steps of:
    causing an information device including a capturing function to use the capturing function to capture an image of a disc wheel to which a plurality of wheel fasteners are fastened; and
    causing the information device to inspect whether any one of the wheel fasteners appearing in the captured image is loose by comparing the captured image with a reference image in consideration of a reference point of the disc wheel appearing in the captured image.

2. The method for detecting wheel fastener looseness according to claim 1,
    wherein the information device further includes a display function,
    the method further comprising the step of causing the information device to use the display function to display an inspection result regarding whether any of the wheel fasteners is loose.

3. The method for detecting wheel fastener looseness according to claim 1, wherein the step of causing the information device to inspect whether any of the wheel fasteners is loose includes causing the information device to correct a tilt of the captured image based on a contour of a wheel disc appearing in the captured image.

4. The method for detecting wheel fastener looseness according to claim 1, wherein the step of causing the information device to inspect whether any of the wheel fasteners is loose includes causing the information device to correct a magnification of the captured image based on a contour of a wheel disc appearing in the captured image.

5. The method for detecting wheel fastener looseness according to claim 1, wherein the step of causing the information device to inspect whether any of the wheel fasteners is loose includes causing the information device to correct a rotation angle of the captured image based on the reference point appearing in the captured image.

6. The method for detecting wheel fastener looseness according to claim 1, wherein the reference point is a position at which an air valve is attached.

7. The method for detecting wheel fastener looseness according to claim 1, wherein the wheel fasteners are wheel nuts or wheel bolts.

8. A device for detecting wheel fastener looseness configured to perform the steps according to claim 1.

9. A non-transitory computer-readable medium carrying a computer program comprising a program code which, when executed on a computer, causes the computer to perform the steps according to claim 1.

10. The method for detecting wheel fastener looseness according to claim 1, wherein the reference image is an image of the disc wheel to which the plurality of wheel fasteners is fastened.

11. A method for detecting wheel fastener looseness, the method comprising the steps of:
    causing an information device including a capturing function to use the capturing unction to capture an image of a disc wheel to which a plurality of wheel fasteners are fastened; and
    causing the information device to inspect whether any one of the wheel fasteners appearing in the captured image is loose by comparing the captured image with a reference image in consideration of a reference point of the disc wheel appearing in the captured image, wherein the reference point is a position at which an air valve is attached.

12. A method for detecting wheel fastener looseness, the method comprising the steps of:
    causing an information device including a capturing function to use the capturing function to capture an image of a disc wheel to which a plurality of wheel fasteners are fastened, the disc wheel comprising a cylindrical rim to which an inner peripheral edge of a tire is assembled, and a disc shaped wheel disc joined to the inner peripheral surface of the rim; and
    causing the information device to inspect whether any one of the wheel fasteners appearing in the captured image is loose by comparing the captured image with a reference image in consideration of a reference point of the disc wheel appearing in the captured image.

13. The method for detecting wheel fastener looseness according to claim 12, wherein the reference point is a position at which a QR code is attached to the wheel disc.

* * * * *